United States Patent
Carey et al.

(10) Patent No.: US 10,223,236 B2
(45) Date of Patent: *Mar. 5, 2019

(54) DYNAMIC CRASH DETECTION AND DEBUGGING ASSISTANCE

(71) Applicant: International Business Machines Corporation, Armonk, NY (US)

(72) Inventors: James E. Carey, Rochester, MN (US); Jim C. Chen, Rochester, MN (US); John M. Santosuosso, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/423,737

(22) Filed: Feb. 3, 2017

(65) Prior Publication Data

US 2018/0225191 A1     Aug. 9, 2018

(51) Int. Cl.
*G06F 11/00*     (2006.01)
*G06F 11/36*     (2006.01)

(52) U.S. Cl.
CPC ........ *G06F 11/3636* (2013.01); *G06F 11/366* (2013.01)

(58) Field of Classification Search
CPC .................... G06F 11/3636; G06F 11/366
See application file for complete search history.

(56) References Cited

U.S. PATENT DOCUMENTS

| 5,819,093 | A  |   | 10/1998 | Davidson et al. |
| 6,077,312 | A  |   | 6/2000  | Bates et al. |
| 6,163,780 | A  | * | 12/2000 | Ross ............... G06F 8/4434 |
| 7,047,519 | B2 |   | 5/2006  | Bates et al. |
| 9,015,675 | B2 |   | 4/2015  | Bates et al. |
| 2004/0083457 | A1 | * | 4/2004 | Boucher ......... G06F 11/3636 717/129 |
| 2006/0101427 | A1 | * | 5/2006 | Yamada ......... G06F 9/30174 717/136 |

(Continued)

OTHER PUBLICATIONS

Gosling et al., "The Java™ Language Specification Java SE 7 Edition", Copyright © 1997, 2011, Oracle and/or its affiliates, 20 pages, See pp. 392-395.

(Continued)

*Primary Examiner* — Bryce P Bonzo
*Assistant Examiner* — Katherine Lin
(74) *Attorney, Agent, or Firm* — Bryan D. Wells (57) ABSTRACT

In an approach to identifying program bugs, one or more computer processor detect a first crash in a try block. The one or more computer processors determine a catch block executed in response to the crash. The one or more computer processors collect a first set of environment information based on the catch block. The one or more computer processors create a first breakpoint where the first crash occurs. The one or more computer processors detect a second crash in the try block using a first pattern associated with the first crash based on the first set of environment information. The one or more computer processors collect a second set of environment information based on the catch block. The one or more computer processors create a second breakpoint where the second crash occurs.

15 Claims, 3 Drawing Sheets

(56) References Cited

U.S. PATENT DOCUMENTS

| | | | |
|---|---|---|---|
| 2008/0172658 A1* | 7/2008 | Russell | G06F 9/45516 |
| | | | 717/138 |
| 2008/0282229 A1 | 11/2008 | Kim et al. | |
| 2011/0321017 A1 | 12/2011 | Kapoor et al. | |
| 2012/0110554 A1 | 5/2012 | Bates et al. | |
| 2016/0124835 A1* | 5/2016 | Davis | G06F 11/366 |
| | | | 714/38.1 |
| 2016/0188439 A1 | 6/2016 | Bates et al. | |

OTHER PUBLICATIONS

Mancier, Patrick, "Debugging with Visual Studio 2005/2008, Part 4: Setting up Code for the Debugger", printed Nov. 16, 2016, <http://www.cprogramming.com/tutorial/visual_studio_debugging_code_setup.html>, 6 pages.

"Try . . . catch", JavaScript IMDN, printed on Oct. 27, 2016, 7 pages, <https://developermozilla.org/en-US/docsWeb/JavaScript/Reference/Statements/try...catch>.

"Using Breakpoints", Visual Studio 2015, © 2016 Microsoft, printed Oct. 26, 2016, <https://msdn.microsoft.com/en-us/library/5557y8b4.aspx>, 10 pages.

Carey et al., "Dynamic Crash Detection and Debugging Assistance", U.S. Appl. No. 15/808,069, filed Nov. 9, 2017, 26 pages.

Appendix P, List of IBM Patents or Patent Applications Treated As Related, 2 pages, dated Nov. 13, 2017.

* cited by examiner

DYNAMIC CRASH DETECTION AND DEBUGGING ASSISTANCE

BACKGROUND OF THE INVENTION

The present invention relates generally to the field of crash detection, and more particularly to debugging assistance.

A crash in computing is when a computer program, such as a software application or an operating system, stops functioning properly (e.g., exits, ceases to respond to inputs, operating system halts, etc.). Most crashes result from the execution of invalid machine instructions (i.e., set of instructions executed directly by a central processing unit). Often, crashes are caused by software bugs (i.e., error, flaw, failure, fault, etc.) in the code of a computer program or system that cause illegal instruction exceptions which may result from invalid requests that produce an incorrect, unexpected result, and/or unintended behavior. Software bugs in the software code start a chain of events that cause a crash, which are discoverable through the process of debugging (i.e., process of finding and resolving defects that prevent correct operation). The original software bug can be far removed from the event of the crash and be caused by the execution of code that appears valid, but produces invalid results.

SUMMARY

Embodiments of the present invention disclose a method, a computer program product, and a system for identifying program bugs. The method may include one or more computer processors detecting a first crash in a try block. The one or more computer processors determine a catch block executed in response to the crash. The one or more computer processors collect a first set of environment information based on the catch block. The one or more computer processors create a first breakpoint where the first crash occurs. The one or more computer processors detect a second crash in the try block using a first pattern associated with the first crash based on the first set of environment information. The one or more computer processors collect a second set of environment information based on the catch block. The one or more computer processors create a second breakpoint where the second crash occurs.

DETAILED DESCRIPTION

Modern day debugging often utilizes exception handling in the code that is not permanent. Exception handling uses try catch blocks in the code that will capture exceptions. A try block is the block of code in which exceptions occur (i.e., a defined block of statements that may throw an exception). A catch block "catches" and handles try block exceptions (i.e., contains statements that specify what to do if an exception is thrown in the try block). For example an exception occurs (e.g., raised). The try block "throws" the raised exception to the catch block, thereby transferring control and the execution. Exceptions are results from the execution of code that fall outside the limits of the code and, therefore, cause errors in execution. In turn, errors in execution cause crashes, which compromise the stability of programs. When the try catch blocks capture an exception, the catch block will often create a breakpoint (i.e., an intentional stopping or pausing place in a program, put in place for debugging purposes) that allows a programmer to review the code and see the location associated with the exception leading to the crash. However, using try catch blocks that capture exceptions requires a programmer to take up valuable time and resources to figure out which line of code causes the crash. Embodiments of the present invention detect particular lines of code that cause crashes by applying machine learning to programs that detect exceptions and create breakpoints. As a result, embodiments of the present invention minimize the time and resources required from programmers to fix bugs by allowing programmers to look at a small problematic portion of the overall code rather than all the code. Implementation of embodiments of the invention may take a variety of forms, and exemplary implementation details are discussed subsequently with reference to the Figures.

Figure 1:
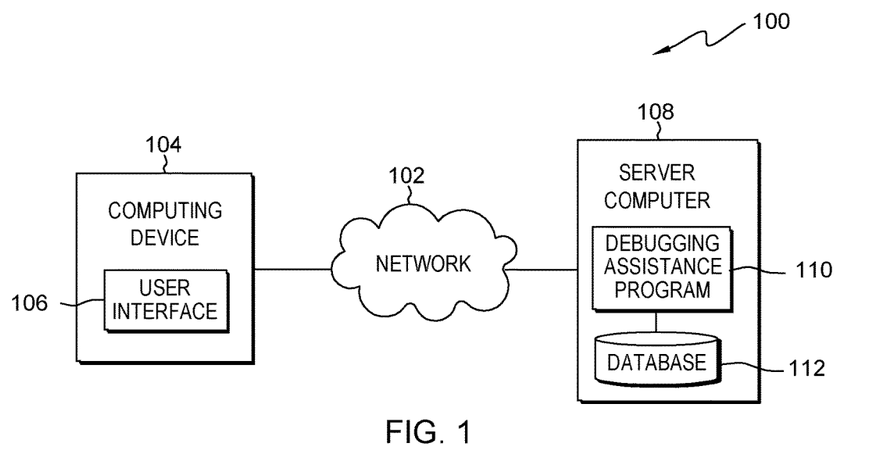
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 104 and server computer 108 interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between computing device 104 and server computer 108, and other computing devices (not shown) within distributed data processing environment 100.

Computing device 104 can be a laptop computer, a tablet computer, a smart phone, or any programmable electronic computing device capable of communicating with various components and devices within distributed data processing environment 100, via network 102. In general, computing device 104 represents any programmable electronic computing device or combination of programmable electronic computing devices capable of executing machine readable program instructions, manipulating executable machine readable instructions, and communicating with server computer 108 and other computing devices (not shown) within distributed data processing environment 100 via a network, such as network 102. Computing device 104 includes an instance of user interface 106. Computing device 104 and user interface 106 allow a programmer to interact with the debugging assistance program 110 and a program to fix problems with the machine readable program instructions, such as code. Further, user interface 106 allows a programmer to provide and adjust debugging parameters in debugging assistance program 110.

User interface 106 provides an interface to debugging assistance program 110 on server computer 108 for a user of computing device 104. In one embodiment, user interface 106 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In another embodiment, user interface 106 may also be mobile application software that provides an interface between a user of computing device 104 and server computer 108. Mobile application software, or an "app," is a computer program designed to run on smart phones, tablet computers and other mobile devices. In an embodiment, user interface 106 enables the user of computing device 104 to register with and configure debugging assistance program 110 to enable tracking of the exception handling and crash data of computing device 104. In another embodiment, user interface 106 may enable the user of computing device 104 to provide debugging parameters to debugging assistance program 110.

Server computer 108 can be a standalone computing device, a management server, a web server, a mobile computing device, or any other electronic device or computing system capable of receiving, sending, and processing data. In other embodiments, server computer 108 can represent a server computing system utilizing multiple computers as a server system, such as in a cloud computing environment. In another embodiment, server computer 108 can be a laptop computer, a tablet computer, a netbook computer, a personal computer (PC), a desktop computer, a personal digital assistant (PDA), a smart phone, or any other programmable electronic device capable of communicating with computing device 104 and other computing devices (not shown) within distributed data processing environment 100 via network 102. In another embodiment, server computer 108 represents a computing system utilizing clustered computers and components (e.g., database server computers, application server computers, etc.) that act as a single pool of seamless resources when accessed within distributed data processing environment 100. Server computer 108 includes debugging assistance program 110 and database 112. Server computer 108 may include internal and external hardware components, as depicted and described in further detail with respect to FIG. 3.

Debugging assistance program 110 detects a crash in a try block. A try block is the block of code in which exceptions occur (i.e., a defined block of statements that may throw an exception). A catch block "catches" and handles try block exceptions (i.e., contains statements that specify what to do if an exception is thrown in the try block). Debugging assistance program 110 determines which catch block executed in response to the crash. Catch blocks execute when there is an exception to the code that creates a result that falls outside of the parameters of the code.

Debugging assistance program 110 collects a first set of environment information such as the code preceding the crash, the code following the crash, the state of variables and the state of buffers. Debugging assistance program 110 creates a breakpoint that allows debugging assistance program 110 and/or a programmer to observe the section of code responsible for the crash. Debugging assistance program 110 detects one or more lines of code that match the first set of environment information, such as the lines of code leading up to a previous crash which will lead to a second crash in the try block. Debugging assistance program 110 collects the second environment information narrowing down which lines of code may be responsible for the crash. For example, a second set of environment information may be a more specific combination of variables leading up to the crash than the previously collected environment information which allows debugging assistance program 110 to narrow down the crash causing exception.

Debugging assistance program 110 creates a second breakpoint based on the second set of environment information. A second breakpoint may be an intentional stopping or pausing place in a program which is put in place for debugging purposes. A breakpoint is a means of acquiring knowledge about a program during its execution. Debugging assistance program 110 determines whether identification of the line of code that causes the crash occurs. Responsive to determining that debugging assistance program 110 has not identified the line of code that causes the crash, debugging assistance program 110 returns to detect patterns that match the crash until a subsequent crash occurs, such as a third, fourth, or fifth crash. Responsive to debugging assistance program 110 identifying the crash causing line of code, debugging assistance program 110 ends. In the depicted embodiment, debugging assistance program 110 resides on server computer 108. In another embodiment, debugging assistance program 110 may reside on computing device 104 provided database 112 is accessible by debugging assistance program 110. Debugging assistance program 110 is depicted and described in further detail with respect to FIG. 2.

Database 112 is a repository for data used and stored by debugging assistance program 110. In the depicted embodiment, database 112 resides on server computer 108. In another embodiment, database 112 may reside elsewhere within distributed data processing environment 100 provided debugging assistance program 110 has access to database 112. A database is an organized collection of data. Database 112 can be implemented with any type of storage device capable of storing data and configuration files that can be accessed and utilized by server computer 108, such as a database server, a hard disk drive, or a flash memory. Database 112 stores debugging and crash data of a computing device, such as computing device 104. Database 112 also stores registration and configuration data inputted by a user of computing device 104 via user interface 106 for the purpose of controlling how debugging assistance program 110 narrows down the circumstances surrounding the crash. Database 112 may also store data associated with the historical debugging and crash data of computing device 104.

Figure 2:
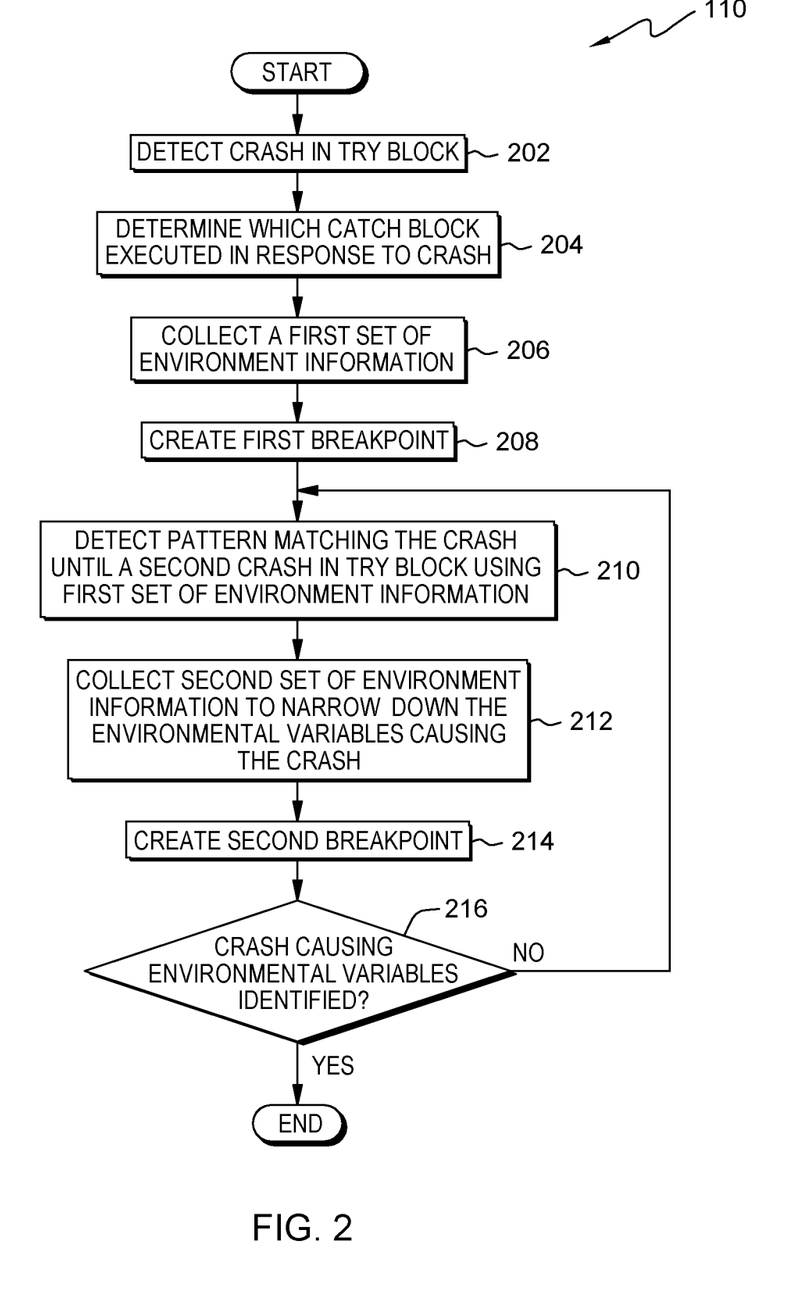
FIG. 2 is a flowchart depicting operational steps of a debugging program, on a server computer within the distributed data processing environment of FIG. 1, for detecting crashes and assisting in debugging, in accordance with an embodiment of the present invention.

FIG. 2 is a flowchart depicting operational steps of debugging assistance program 110, on server computer 108 within distributed data processing environment 100 of FIG. 1, a program for detecting crashes and assisting in debugging code by narrowing down which line of code is responsible for crashes, in accordance with an embodiment of the present invention. Debugging assistance program 110 starts when a crash occurs in the try block of code. Debugging assistance program 110 continues to run until debugging assistance program 110 identifies one or more crash causing lines of code and the circumstances surrounding the crash, such as which exceptions caused the crash.

Debugging assistance program 110 detects a crash in the try block (step 202). A crash occurs when a computer program, such as a software application or an operating system, stops functioning (i.e., stops operating properly, freezes, held up due to computing errors and/or faults, or terminates entirely). Crashes often occur upon the execution of invalid machine instructions. Exceptions may cause invalid machine instructions, which result from the execution of code that fall outside the parameters of the program. Exceptions may take a variety of forms, such as arithmetic exceptions, array index out of bounds exceptions, number format exceptions, string index out of bound exceptions, and null pointer exceptions. Further, exceptions may be caused by buffer overflow, incorrect memory addressing, illegal instructions, accessing unauthorized system resources, and accessing unallocated memory space. However, the exceptions referenced with regard to the invention herein may be any exception resulting in invalid results from the execution of code. Debugging assistance program 110 detects exceptions in the try block of the execution of code. For example, the code includes a mathematical equation that is within a try block. During execution of the mathematical equation, an instance of a division by zero occurs thereby causing an arithmetic exception to occur which causes the try block to raise an exception. Debugging assistance program 110 detects the raising of the arithmetic exception within the try block in response to the raising of the exception due to the divide by zero error. In one embodiment, the exceptions referenced with regard to the invention herein may be any exception resulting in invalid results from the execution of code. In another embodiment, the exceptions may be an exception resulting from a combination of invalid results from the execution of code and one or more of the aforementioned variety of forms.

Debugging assistance program 110 determines the catch block executed in response to the crash to start the debugging assistance process (step 204). Catch blocks are associated with a corresponding try block. A corresponding catch block executes in response to an exception to a try block. In an embodiment, debugging assistance program 110 uses the type of catch block executed in response to the exception to determine where to enable one or more breakpoints and collect data around the one or more breakpoints. Catch blocks execute automatically when a particular exception occurs. A try/catch block may also be nested with one or more try/catch statements. Each try statement has a matching catch statement to handle the exception. If an exception's inner try statement does not have a matching catch statement, subsequent try statement catch handlers are checked. This process continues until all inner try statements are checked for a matching catch statement. If a catch statement does not match, the runtime system handles the exception. For example, a debugging program may have catch blocks for all the various exceptions that may occur in the event of a crash, such as an arithmetic exception. By identifying which catch block executed in response to a crash and where in the execution of the try block the catch block executed, debugging assistance program 110 can generally determine which exception caused the program to crash and where the crash causing one or more lines of code exist in the code.

Debugging assistance program 110 collects a first set of environment information (step 206). Debugging assistance program 110 identifies a section of code leading to the crash and the environmental variables responsible for the crash, such as the code preceding the crash, the code following the crash, the state of variables and the state of buffers. For example, debugging assistance program 110 may narrow down the environmental variables that may have caused a particular crash associated with a particular exception to a section that contains ten lines of code and identify that the crash was caused by accessing unauthorized system resources. Initially, debugging assistance program 110 may broadly determine the area in the code where the one or more crash causing lines of code exist. For example, debugging assistance program 110 may record from to the last valid calculation before the exception to a few lines after the exception. As a result, the one or more crash causing lines of code may be in line seven of the ten lines of code identified by debugging assistance program 110.

However, debugging assistance program 110 may also identify the particular line of code immediately and the information collected may be a set of circumstances associated with environmental variables, such as the state of the buffer, the state of variables, program inputs, such as numerical values inputted into the code, and/or information enabling the identification of the particular environmental variables leading to the crash, such as the processing statistics, and thread counts. As a result, debugging assistance program 110 provides enough information to enable a programmer to identify the crash causing environmental variables surrounding the problematic line of code. In another example, debugging assistance program 110 may identify a particular crash causing line of code associated with a particular exception with a sufficient confidence interval, such as a 90% confidence interval, and identify the ten lines of code preceding the crash, the processing statistics, and the thread counts for additional monitoring in a multithread processing system. Multithreading is a widespread programming and execution model that allows multiple threads to exist within the context of one process. These threads share process resources but are able to execute independently. A confidence interval uses sample data to calculate an interval of possible or probable values of a particular parameter as the cause of an effect on the system.

However, the confidence interval required to execute the aforementioned example may be any confidence interval that may be deemed sufficient by a programmer or a machine learning algorithm. For example, a machine learning algorithm may determine that previous instances of crashes caused by the same or similar set of environmental variables led to a 98% confidence interval that a line calculating a value caused an arithmetic exception. Furthermore, the types of environment information debugging assistance program 110 identifies may be any environment information deemed sufficient by a programmer or a machine learning algorithm. In an embodiment, debugging assistance program 110 may identify the section of code and the type of exception that lead to crash. For example, debugging assistance program 110 may identify ten lines of code preceding the crash and identify that an arithmetic exception caused the crash based on the catch block executed in response to an arithmetic exception.

Debugging assistance program 110 creates a first breakpoint specifying the type of caught exception (step 208). Breakpoints are pauses or stops executed in a program which provide a general means of acquiring knowledge about a program during program execution. Breakpoints provide a human or machine-based programmer with specific information regarding the crash to better assist in identifying the one or more crash causing lines of code and the specific exceptions caused the crash. In an embodiment, debugging assistance program 110 creates a breakpoint specific to the type of exception that caused the crash which provides a programmer with information regarding the type of exception and the area of the code responsible for the crash. Debugging assistance program 110 identifies the crash causing exception by identifying which catch block executed in response to the exception. For example, debugging assistance program 110 may execute a breakpoint that identifies that an arithmetic exception triggered the catch block and the section of code that lead to the crash. As a result, a programmer can hone in on the problematic lines of code more quickly and administer fixes to patch the particular problems in the code.

Debugging assistance program 110 detects a pattern matching the first crash indicating a second crash in the try block using collected environment information (step 210). In an embodiment, debugging assistance program 110 detects the occurrence of an exception identical or substantially similar, such as an exception caused by the same variables but producing different values, to the previous crash-causing exception using the collected environment information. For example, debugging assistance program 110 monitors the execution of a problematic section of code and anticipates the triggering of an arithmetic exception prior to the crash occurring. As a result, debugging assistance program 110 begins monitoring the crash as soon as the previously identified section of code that may contain the one or more crash causing lines of code execute. Early monitoring allows debugging assistance program 110 to specifically identify the one or more crash causing lines of code responsible for the same exception that triggers the same catch block in the prior iteration. However, the same exception need not be executed under the exact same circumstances. For example, an integer exception, such as a circumstance where an integer is divided by zero, does not need to be triggered by the same numerator as before, so the numerator may be any integer as long as the numerator is divided by zero.

Debugging assistance program 110 collects a second set of environment information to narrow down the one or more environmental variables causing the crash (step 212). The second set of environment information may be identical or substantially similar to the previous set of environment information. For example, the environmental variables triggering the crash may be the same but the outcome may be different based on the inputted values causing an arithmetic exception. Debugging assistance program 110 identifies the environmental variables leading to the crash. Debugging assistance program 110 may narrow down the variables leading to the crash, such as the processing statistics and thread counts associated with the crash causing code. For example, debugging assistance program 110 may look for the point that the denominator changes to zero after identifying that the error occurs at the moment an integer is divided by zero. In another example, debugging assistance program 110 may narrow down the lines of code that may have caused a prior crash associated with an identical or substantially similar exception to a section that contains five lines of code rather than the ten lines of code identified in the first collection of environment information when debugging assistance program 110 identifies that the denominator likely changes to zero within five lines of code before the exception occurs. In another example, debugging assistance program 110 may identify five lines of code preceding the crash rather than the ten lines of code identified in the first collection of environment information.

Illustrating the aforementioned example, debugging assistance program 110 may identify a particular crash causing line of code associated with a particular exception with a sufficient confidence interval, such as a 90% confidence interval, and hone in on five lines of code preceding the crash rather than the ten lines previously identified for monitoring. However, the confidence interval required to execute the aforementioned example may be any confidence interval that may be deemed sufficient by a programmer or a machine learning algorithm. Furthermore, the number of lines debugging assistance program 110 identifies may be any number of lines deemed sufficient by a programmer or a machine learning algorithm. In another embodiment, debugging assistance program 110 may identify a narrower section of code and a more specific type of exception that lead to crash. For example, debugging assistance program 110 may identify five lines of code preceding the crash rather than the ten lines of code identified in the first collection of environment information and identify that an arithmetic exception caused the crash.

Debugging assistance program 110 creates a second breakpoint (step 214). In an embodiment, debugging assistance program 110 includes information such as the type of exception that triggered the catch block, the one or more lines of code that caused the crash, and the specific circumstances that caused the catch block to trigger in a breakpoint. For example, debugging assistance program 110 may create a breakpoint that states that the exception was an integer exception caused by line seven of the identified section of code which was triggered by the division of a particular integer by zero. In an embodiment, debugging assistance program 110 creates a second breakpoint in closer proximity to the one or more lines of code that caused the crash. For example, debugging assistance program may create a second breakpoint around a narrower section of code containing five lines of code to replace a first breakpoint containing ten lines of code. In another embodiment, debugging assistance program 110 creates a second breakpoint that defines a narrower section of code encapsulating the one or more line of code that caused the crash, thereby allowing a programmer to more easily find the crash causing code. In another embodiment, debugging assistance program 110 creates a second breakpoint specifically identifying the line of code and the exception that caused the crash. For example, debugging assistance program 110 may narrow down the crash to a singular line of code after multiple cycles of identifying crashes, collecting environment information, and creating breakpoints.

Debugging assistance program 110 determines whether debugging assistance program 110 identified one or more crash causing environmental variables (decision block 216). Debugging assistance program 110 determines if debugging assistance program 110 identified the one or more crash causing lines of code. If debugging assistance program 110 identifies a singular exception, a set of circumstances causing the exception, and/or a line of code responsible for causing the crash, then debugging assistance program 110 determines that debugging assistance program 110 identified the one or more crash causing environmental variables. The set of circumstances causing the exception may include the specific state of the buffer, the specific state of variables, particular program inputs, such as the numerical values inputted into the code, and/or information enabling the identification of the particular environmental variables leading to the crash, such as the processing statistics and thread counts. For example, the set of circumstances may include a particular set of program inputs, such as the input of values ranging from 100 to 200, causing an arithmetic exception by making the denominator zero in the execution of a specific line of code. In another example, the set of circumstances may include processing statistics indicating that the program is attempting to access an unauthorized database, and, therefore, the program is attempting to access unauthorized system resources. If debugging assistance program 110 does not identify a singular exception, a set of environmental variables causing the exception, and/or a line of code responsible for causing the crash, then debugging assistance program 110 determines that debugging assistance program 110 has not identified the one or more crash causing circumstance. However, debugging assistance program 110 is not limited to the embodiments mentioned herein and may use any available metric to determine whether debugging assistance program 110 identified the one or more crash causing circumstances.

Responsive to debugging assistance program 110 not identifying the crash causing line of code (decision block 216, no branch), debugging assistance program 110 continues to detect patterns matching the crash until a subsequent crash in the try block by using collected environment information (step 210). In an embodiment, debugging assistance program 110 returns to detecting patterns matching the set of circumstances associated with the crash. In another embodiment, debugging assistance program 110 returns to detecting patterns substantially similar to the set of circumstances associated with the crash. For example, debugging assistance program 110 may detect a pattern, such as a particular configuration of crash causing circumstances, that causes the same crash using the same exception but using a different arithmetic exception, such as the execution of code producing a different integer falling outside the parameters of the code. In another example, debugging assistance program 110 may receive an input which triggers a subroutine to check that the input does not produce a value of zero because a denominator value of zero in the execution of the section of code is known to cause an arithmetic exception.

Responsive to debugging assistance program 110 identifying the crash causing line of code (decision block 216, yes branch), debugging assistance program 110 terminates. In an embodiment, debugging assistance program 110 may continue monitoring for further crash causing one or more lines of code. In yet another embodiment, debugging assistance program 110 may continue monitoring the one or more lines of code to confirm that a fix has been executed properly by a programmer or machine.

Figure 3:
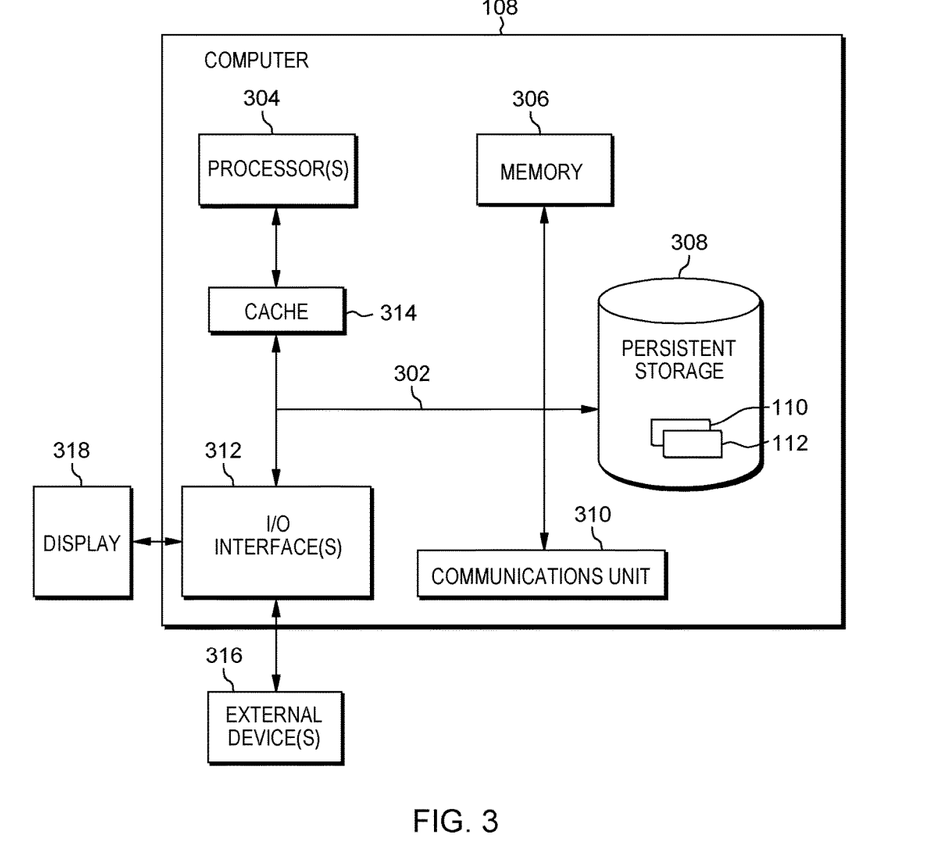
FIG. 3 depicts a block diagram of components of the server computer executing the debugging assistance program within the distributed data processing environment of FIG. 1, in accordance with an embodiment of the present invention.

FIG. 3 depicts a block diagram of components of server computer 108 within distributed data processing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

Server computer 108 can include processor(s) 304, cache 314, memory 306, persistent storage 308, communications unit 310, input/output (I/O) interface(s) 312 and communications fabric 302. Communications fabric 302 provides communications between cache 314, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM). In general, memory 306 can include any suitable volatile or non-volatile computer readable storage media. Cache 314 is a fast memory that enhances the performance of processor(s) 304 by holding recently accessed data, and data near recently accessed data, from memory 306.

Program instructions and data used to practice embodiments of the present invention, e.g., debugging assistance program 110 and database 112, are stored in persistent storage 308 for execution and/or access by one or more of the respective processor(s) 304 of server computer 108 via cache 314. In this embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices, including resources of client computing device 104. In these examples, communications unit 310 includes one or more network interface cards. Communications unit 310 may provide communications through the use of either or both physical and wireless communications links. Debugging assistance program 110, database 112, and other programs and data used for implementation of the present invention, may be downloaded to persistent storage 308 of server computer 108 through communications unit 310.

I/O interface(s) 312 allows for input and output of data with other devices that may be connected to server computer 108. For example, I/O interface(s) 312 may provide a connection to external device(s) 316 such as a keyboard, a keypad, a touch screen, a microphone, a digital camera, and/or some other suitable input device. External device(s) 316 can also include portable computer readable storage media such as, for example, thumb drives, portable optical or magnetic disks, and memory cards. Software and data used to practice embodiments of the present invention, e.g., debugging assistance program 110 and database 112 on server computer 108, can be stored on such portable computer readable storage media and can be loaded onto persistent storage 308 via I/O interface(s) 312. I/O interface(s) 312 also connect to a display 318.

Display 318 provides a mechanism to display data to a user and may be, for example, a computer monitor. Display 318 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for identifying program bugs, the method comprising:
   detecting, by one or more computer processors, a first crash in a try block;
   determining, by the one or more computer processors, a catch block executed in response to the crash;
   collecting, by the one or more computer processors, a first set of environment information based on the catch block, wherein the first set of environment information includes one or more lines of code and one or more sets of circumstances;
   creating, by the one or more computer processors, a first breakpoint where the first crash occurs;
   detecting, by the one or more computer processors, a second crash in the try block using a first pattern associated with the first crash based on the first set of environment information;
   collecting, by the one or more computer processors, a second set of environment information based on the catch block, wherein the second set of environment information includes one or more lines of code and one or more sets of circumstances;
   creating, by the one or more computer processors, a second breakpoint where the second crash occurs;
   comparing, by the one or more computer processors, the one or more lines of code and one or more sets of circumstances associated with the first set of environment information and the second set of environment information;
   determining, by the one or more computer processors, whether one or more crash causing environmental variables are identified based on the comparison between the one or more lines of code and one or more sets of circumstances associated with the first set of environment information and the second set of environment information; and
   responsive to determining, by the one or more computer processors, that the one or more crash causing environmental variables are identified, creating, by the one or more computer processors, a final breakpoint identifying one or more lines of code and the one or more sets of circumstances associated with the one or more crash causing environmental variables based, at least in part, on a confidence interval determined by a machine learning algorithm that represents a confidence in a determination that the one or more crash causing environmental variables caused the final breakpoint to produce an exception in one or more crashes preceding the first crash and the second crash.

2. The method of claim 1 further comprising, responsive to determining that the one or more crash causing environmental variables are not identified, detecting, by the one or more computer processors, a second pattern matching the first crash and the second crash in the try block using the first set of environment information and the second set of environment information.

3. The method of claim 1, wherein the exception is selected from a group consisting of: an arithmetic exception, an array index out of bounds exception, a number format exception, a string index out of bound exception, and a null pointer exception.

4. The method of claim 1, wherein the first set of environment information includes one or more catch blocks executed in response to the crash and one or more sets of circumstances associated with one or more crash causing environmental variables.

5. A computer program product for identifying program bugs, the computer program product comprising:
   one or more computer readable storage devices and program instructions stored on the one or more computer readable storage devices, the stored program instructions comprising:
   program instructions to detect a first crash in a try block;
   program instructions to determine a catch block executed in response to the crash;
   program instructions to collect a first set of environment information based on the catch block, wherein the first set of environment information includes one or more lines of code and one or more sets of circumstances;
   program instructions to create a first breakpoint where the first crash occurs;
   program instructions to detect a second crash in the try block using a first pattern associated with the first crash based on the first set of environment information;
   program instructions to collect a second set of environment information based on the catch block, wherein the second set of environment information includes one or more lines of code and one or more sets of circumstances;
   program instructions to create a second breakpoint where the second crash occurs;
   program instructions to compare the one or more lines of code and one or more sets of circumstances associated with the first set of environment information and the second set of environment information; and
   program instructions to determine whether one or more crash causing environmental variables are identified based on the comparison between the one or more lines of code and one or more sets of circumstances associated with the first set of environment information and the second set of environment information; and
   responsive to determining that the one or more crash causing environmental variables are identified, program instructions to create a final breakpoint identifying one or more lines of code and the one or more sets of circumstances associated with the one or more crash causing environmental variables based, at least in part, on a confidence interval determined by a machine learning algorithm that represents a confidence in a determination that the one or more crash causing environmental variables caused the final breakpoint to produce an exception in one or more crashes preceding the first crash and the second crash.

6. The computer program product of claim 5, further comprising, responsive to determining that the one or more crash causing environmental variables are not identified, program instructions to detect a second pattern matching the first crash and the second crash in the try block using the first set of environment information and the second set of environment information.

7. The computer program product of claim 5, wherein the exception is selected from a group consisting of: an arithmetic exception, an array index out of bounds exception, a number format exception, a string index out of bound exception, and a null pointer exception.

8. The computer program product of claim 5, wherein the first set of environment information includes one or more catch blocks executed in response to the crash and one or more sets of circumstances associated with one or more crash causing environmental variables.

9. A computer system for identifying program bugs, the computer system comprising:
   one or more computer processors;
   one or more computer readable storage devices;
   program instructions stored on the one or more computer readable storage devices for execution by at least one of the one or more computer processors, the stored program instructions comprising:
   program instructions to detect a first crash in a try block;
   program instructions to determine a catch block executed in response to the crash;
   program instructions to collect a first set of environment information based on the catch block, wherein the first set of environment information includes one or more lines of code and one or more sets of circumstances;
   program instructions to create a first breakpoint where the first crash occurs;
   program instructions to detect a second crash in the try block using a first pattern associated with the first crash based on the first set of environment information;
   program instructions to collect a second set of environment information based on the catch block, wherein the second set of environment information includes one or more lines of code and one or more sets of circumstances;
   program instructions to create a second breakpoint where the second crash occurs;
   program instructions to compare the one or more lines of code and one or more sets of circumstances associated with the first set of environment information and the second set of environment information; and
   program instructions to determine whether one or more crash causing environmental variables are identified based on the comparison between the one or more lines of code and one or more sets of circumstances associated with the first set of environment information and the second set of environment information; and
   responsive to determining that the one or more crash causing environmental variables are identified, program instructions to create a final breakpoint identifying one or more lines of code and the one or more sets of circumstances associated with the one or more crash causing environmental variables based, at least in part, on a confidence interval determined by a machine learning algorithm that represents a confidence in a determination that the one or more crash causing environmental variables caused the final breakpoint to produce an exception in one or more crashes preceding the first crash and the second crash.

10. The computer system of claim 9, further comprising, responsive to determining that the one or more crash causing environmental variables are not identified, program instructions to detect a second pattern matching the first crash and the second crash in the try block using the first set of environment information and the second set of environment information.

11. The computer system of, wherein the exception is selected from a group consisting of: an arithmetic exception, an array index out of bounds exception, a number format exception, a string index out of bound exception, and a null pointer exception.

12. The computer system of claim 9, wherein the first set of environment information includes one or more catch blocks executed in response to the crash and one or more sets of circumstances associated with one or more crash causing environmental variables.

13. The method of claim 1, wherein:
   the first set of environment information comprises code preceding the first crash, code following the first crash, states of one or more variables during the first crash, and states of one or more buffers during the first crash; and
   wherein the second set of environment information comprises code preceding the second crash, code following the second crash, states of one or more variables during the second crash, and states of one or more buffers during the second crash.

14. The method of claim 13, wherein:
   the first breakpoint represents a first set of lines of code encapsulating code that caused the first crash; and
   the second breakpoint represents a second set of lines of code encapsulating the code that caused first crash.

15. The method of claim 14, wherein a line count of the second set of lines of code encapsulating the code that caused the first crash is less than a line count of the first set of lines of code encapsulating the code that caused the first crash.

* * * * *